United States Patent
Xu et al.

(10) Patent No.: US 10,650,559 B2
(45) Date of Patent: May 12, 2020

(54) METHODS AND SYSTEMS FOR SIMPLIFIED GRAPHICAL DEPICTIONS OF BIPARTITE GRAPHS

(71) Applicant: Robert Bosch GmbH, Stuttgart (DE)

(72) Inventors: Panpan Xu, Sunnyvale, CA (US); Liu Ren, Cupertino, CA (US); Gromit Yeuk-Yin Chan, Brooklyn, NY (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/967,269

(22) Filed: Apr. 30, 2018

(65) Prior Publication Data
US 2019/0333256 A1    Oct. 31, 2019

(51) Int. Cl.
*G06T 11/20* (2006.01)

(52) U.S. Cl.
CPC .................. *G06T 11/206* (2013.01)

(58) Field of Classification Search
CPC .... G06T 11/206; G06F 16/906; G06F 16/904; G06F 16/9024
See application file for complete search history.

(56) References Cited

U.S. PATENT DOCUMENTS

| | | |
|---|---|---|
| 2012/0158696 A1 | 6/2012 | Arasu et al. |
| 2012/0278021 A1 | 11/2012 | Lin et al. |
| 2014/0143280 A1 | 5/2014 | Duan et al. |
| 2015/0220530 A1* | 8/2015 | Banadaki ............... G06F 16/90 707/723 |
| 2016/0140208 A1* | 5/2016 | Dang .................... G06F 17/18 707/737 |
| 2016/0247170 A1 | 8/2016 | Soulakis et al. |
| 2017/0063910 A1 | 3/2017 | Muddu et al. |

OTHER PUBLICATIONS

Navlakha et al., Graph Summarization with Bounded Error, SIGMOD '08, Jun. 9-12, 2008, Vancouver, BC Canada. Copyright 2008 ACM 978-1-60558-102-6/08/06. (Year: 2008).*
Kakkar et al., Discovering Overlapping Community Structure in Networks through Co-clustering, 2016 International Conference on Inventive Computation Technologies (ICICT), 2016. (Year: 2016).*

(Continued)

*Primary Examiner* — Maurice L. McDowell, Jr.
*Assistant Examiner* — Donna J. Ricks
(74) *Attorney, Agent, or Firm* — Maginot, Moore & Beck LLP

(57) ABSTRACT

A method for generating a graphical display of a bipartite graph includes receiving bipartite graph data, generating, a first meta-node including at least two nodes in the first set of nodes in the bipartite graph data and a second meta-node including at least two nodes in a second set of nodes in the bipartite graph data based on the bipartite graph data using a minimum description length (MDL) optimization process to generate the first meta-node and the second meta-node. The method further includes generating a first graphical depiction of the first meta-node and the second meta-node, the graphical depiction including a single edge connecting the first meta-node and the second meta-node to provide a summarized display of the bipartite graph data.

20 Claims, 10 Drawing Sheets

(56) References Cited

OTHER PUBLICATIONS

Dunne, Cody et al., "Motif Simplification: Improving Network Visualization Readability with Fan, Connector, and Clique Glyphs," Department of Computer Science and Human-Computer Interaction Lab, University of Maryland, College Park, MD, available prior to Apr. 30, 2018 (11 pages).
Liu, Yike et al., "Graph Summarization Methods and Applications: A Survey," Cornell University Library, arXiv:1612.04883v3; 2016, retrieved from internet: https://arxiv.org/abs/1612.04883, Available prior to Apr. 30, 2018 (34 pages).
Maccioni, Antonio et al., "Scalable Pattern Matching over Compressed Graphs via Dedensification," KDD '16, Aug. 2016, San Francisco, CA (10 pages).
Dhulipala, Laxman et al., "Compressing Graphs and Indexes with Recursive Graph Bisection," KDD '16, Aug. 2016, San Francisco, CA (10 pages).
Rohe, Karl et al., "Co-clustering for directed graphs: the Stochastic co-Blockmodel and spectral algorithm Di-Sim," Cornell University Library, arXiv:1204.2296v2, 2015 (39 pages).
Holder, Lawrence B. et al., "Substructure Discovery in the SUBUE System," AAAI Technical Report WS-94-03, 1994 (12 pages).
"DOT (graph description language)," Wikipedia, last modified Apr. 23, 2018, retrieved from internet: https://en.wikipedia.org/wiki/DOT_(graph_description_language) (6 pages).
Bernard, M., "Graph File Formats," retrieved from internet: http://www2.sta.uwi.edu/~mbernard/research_files/fileformats.pdf, retrieved Apr. 12, 2018 (50 pages).
Navlakha, Saket et al., "Graph Summarization with Bounded Error," SIGMOD'08, Jun. 2008, Vancouver, BC, Canada (13 pages).
Leskovec, Jure et al., "Mining of Massive Datasets," Cambridge University Press, Dec. 2014, New York, NY, ISBN:1107077230 9781107077232 (513 pages).
Barron, Andrew et al., "The Minimum Description Length Principle in Coding and Modeling," IEEE Transactions on Information Theory, vol. 44, No. 6, Oct. 1998 (18 pages).
International Search Report corresponding to International Patent Application PCT/EP2019/058512 (3 pages).
Xu, P. et al., "Interactive Visual Co-Cluster Analysis of Bipartite Graphs," 2016 IEEE Pacific Visualization Symposium, 2016 (8 pages).
Khan, K. U. et al., "Set-based Approach for Lossless Graph Summarization using Locality Sensitive Hashing," IEEE International Conference on Data Engineering Workshops, 2015 (5 pages).
Chan, G. Y. et al., "ViBr: Visualizing Bipartite Relations at Scale with the Minimum Description Length Principle," IEEE 2018, (10 pages).

\* cited by examiner

700

---

Algorithm 1

Input: Bipartite relation $R \subseteq U \times V$ where $U$ and $V$ are the two set of nodes
Output: Partition of $U$, denoted as $P$ and partition of $V$, denoted as $Q$, summary graph $G \subseteq P \times Q$ /* Initialization step                                    */
1  $Q = \{\{u\}|u \in U\}; P = \{\{v\}|v \in V\}$
2  $G \subseteq P \times Q, (\{u\},\{v\}) \in G$ iff $(u,v) \in R$
3  $\Delta L_{max} = 1$
   /* Iterative merging step, until no cost reduction is
      possible                                            */
4  while $\Delta L_{max} > 0$ do
      /* Merge meta-nodes in $Q$                          */
5     $q' = random\_select(Q)$
6     $\Delta L_{max} = 0$
7     $q_{max} = undefined$
8     for $q \in two\_hop\_neighbors(q', G)$ do
9       $\Delta L = 0$
10      for $p \in neighbors(q, G) \cup neighbors(q', G)$ do
11        $\Delta L\mathrel{+}= cost\_reduction\_for\_bundling((p,q'),(p,q))$
12      end
13      $\Delta L\mathrel{+}= \beta_Q$
14      if $\Delta L > \Delta L_{max}$ then
15        $\Delta L_{max} = \Delta L$
16        $q_{max} = q$
17      end
18    end
      /* Merge two meta-nodes if cost reduction is possible  */
19    if $\Delta L_{max} > 0$ then
20      $merge(q', q_{max})$
21    end
      /* Merge meta-nodes in $P$                          */
      /* Same procedure as for $Q$...                     */
22 end
   /* Output results                                      */
23 return $P$, $Q$, and $G$

FIG. 7

```
Algorithm 2
    Input: Bipartite relation R ⊆ U × V where U and V are the two set of nodes
    Output: Partition of U, denoted as P and partition of V, denoted as Q
    /* Initialization step                                                    */
1   Q = {{u}|u ∈ U}; P = {{v}|v ∈ V}
2   G ⊆ P × Q, ({u},{v}) ∈ G iff (u,v) ∈ R
3   ΔL_max = 1
4   th = 0.99, th_cutoff = 0.1, th_decay = 0.9
    /* Iterative merging step                                                 */
5   while th > th_cutoff do
6   |   T_P = build_lsh_table(P,G,th)
7   |   T_Q = build_lsh_table(Q,G,th)
8   |   while ΔL_max > 0 do
            /* Merge meta-nodes in Q                                          */
9   |   |   q' = random_select(Q)
10  |   |   ΔL_max = 0
11  |   |   q_max = undefined
12  |   |   for q ∈ query_lsh_table(q',G) do
13  |   |   |   ΔL = 0
14  |   |   |   for p ∈ neighbors(q,G) ∪ neighbors(q',G) do
15  |   |   |   |   ΔL += cost_reduction_for_bundling((p,q'),(p,q))
16  |   |   |   end
17  |   |   |   ΔL += β_Q
18  |   |   |   if ΔL > ΔL_max then
19  |   |   |   |   ΔL_max = ΔL
20  |   |   |   |   q_max = q
21  |   |   |   end
22  |   |   end
            /* Merge two meta-nodes if cost reduction is possible
                                                                              */
23  |   |   if ΔL_max > 0 then
24  |   |   |   merge(q',q_max)
25  |   |   end
            /* Merge meta-nodes in P                                          */
            /* Same procedure as for Q...                                     */
26  |   end
27  |   th *= th_decay
28  end
```

Algorithm 3: $cost\_reduction\_for\_bundling((p,q),(p,q'))$

Input: $R \subseteq U \times V$, Current partition $P$ and $Q$, $p \in P$ and $q, q' \in Q$, $G \subseteq P \times Q$
Output: Cost reduction $\Delta$ for bundling $(p,q), (p,q')$ 1   $\Delta = 0$
    /* Calculate description length for $(p,q)$    */
2   if $(p,q) \in G$ then
3      $\Delta + = 1$
4      $\Delta + = \alpha \cdot (\|p \times q\| - \|(p \times q) \cap R\|)$
5   else
6      $\Delta + = \alpha \cdot \|(p \times q) \cap R\|$
7   end
    /* Calculate description length for $(p,q')$    */
8   if $(p,q') \in G$ then
9      $\Delta + = 1$
10    $\Delta + = \alpha \cdot (\|p \times q'\| - \|(p \times q') \cap R\|)$
11   else
12    $\Delta + = \alpha \cdot \|(p \times q') \cap R\|$
13   end
    /* Calculate description length for $(p, q \cup q')$    */
14   if $\|(p \times (q \cup q')) \cap R\| > 0.5 \times \|p \times (q \cup q')\|$ then
15    $\Delta - = 1$
16    $\Delta - = \alpha \cdot (\|p \times (q \cup q')\| - \|(p \times (q \cup q')) \cap R\|)$
17   else
18    $\Delta - = \alpha \cdot \|(p \times (q \cup q')) \cap R\|$
19   end
    /* Output results    */
20   return $\Delta$

Algorithm 4: $merge(q, q')$

Input: $R \subseteq U \times V$, Current partition $P$ and $Q$, $q, q' \in Q$, $G \subseteq P \times Q$
Output: Updated $P, Q, G \subseteq P \times Q$ 1. remove $q, q'$ from $Q, G$
2. remove all edges adjacent to $q$ or $q'$ from $G$
3. add $q \cup q'$ to $Q, G$
4. for $p \in P$ do
5.     if $\|p \times (q \cup q') \cap R\| > 0.5 \cdot \|p \times (q \cup q')\|$ then
6.         add edge $(p, q \cup q')$ to $G$
7.     end
8. end

METHODS AND SYSTEMS FOR SIMPLIFIED GRAPHICAL DEPICTIONS OF BIPARTITE GRAPHS

FIELD

This disclosure relates generally to the field of computer graphics and, more specifically, to systems and methods for generating graphical displays of bipartite graph data.

BACKGROUND

Unless otherwise indicated herein, the materials described in this section are not prior art to the claims in this application and are not admitted to the prior art by inclusion in this section.

Bipartite graphs depict the relationships between two different types of entities. Bipartite graphs are used in a wide range of data visualization and analysis domains. Non-limiting examples of systems that generate graphical displays of bipartite graphs include the automated graphical display of event logs that are recorded during the operation of a motor vehicle that map particular vehicles or vehicle models to sets of mechanical issues, graphical displays of consumers and products that the consumers buy, graphical displays of legislators mapped to bills supported by the legislators, and graphical displays of relationships between users of social media networks and different groups in the social media networks.

While bipartite graphs are useful for visualizing the relationships between entities, more complex bipartite graphs that contain a large number of entities and connections can often be difficult for humans to interpret when these large graphs are depicted on a display screen, printed, or otherwise generated in an automated manner. In particular, many complex graphs that include hundreds, thousands, or even higher numbers of entities and connections can be displayed using modern computing systems. However, the graphical depictions of these bipartite graphs are often extremely cluttered and cannot easily be understood by human users who analyze the graphs. Consequently, improvements to methods and systems that generate graphical depictions of bipartite graphs that improve the generation of graphics representing bipartite graphs to reduce clutter and improve understandability of the graphs would be beneficial.

SUMMARY

In one embodiment, a method for generating a graphical display of a bipartite graph has been developed. The method includes receiving, with a processor, bipartite graph data. The bipartite graph data further include a first set including a first plurality of nodes, a second set including a second plurality of nodes, and a plurality of edges, each edge in the plurality of edges connecting one node in the first plurality of nodes to another node in the second plurality of nodes. The method also includes generating, with the processor, a first meta-node including at least two nodes in the first plurality of nodes and a second meta-node including at least two nodes in the second plurality of nodes based on the bipartite graph data using a minimum description length (MDL) optimization process to generate the first meta-node and the second meta-node, and generating, with the processor and a display output device, a first graphical depiction of the first meta-node and the second meta-node, the graphical depiction including a single edge connecting the first meta-node and the second meta-node to provide a summarized display of the bipartite graph data.

In another embodiment, a system for generation of graphical depictions of a bipartite graph has been developed. The system includes a display output device, a memory, and a processor operatively connected to the display output device and the memory. The memory is configured to store program instructions and bipartite graph data, the bipartite graph data further including a first set including a first plurality of nodes, a second set including a second plurality of nodes, and a plurality of edges, each edge in the plurality of edges connecting one node in the first plurality of nodes to another node in the second plurality of nodes. The processor is configured to execute the program instructions to generate a first meta-node including at least two nodes in the first plurality of nodes and a second meta-node including at least two nodes in the second plurality of nodes based on the bipartite graph data using a minimum description length (MDL) optimization process to generate the first meta-node and the second meta-node, and generate a first graphical depiction of the first meta-node and the second meta-node, the graphical depiction including a single edge connecting the first meta-node and the second meta-node to provide a summarized display of the bipartite graph data using the display output device.

BRIEF DESCRIPTION OF THE DRAWINGS

FIG. 7 is a pseudocode listing of one embodiment of the process of FIG. 3.

FIG. 8 is a pseudocode listing of another embodiment of the process of FIG. 3.

FIG. 9 is a pseudocode listing of a process for determining a reduction in description length as part of a minimum description length optimization process used in the processes of FIG. 2-FIG. 3 and FIG. 7-FIG. 8.

FIG. 10 is a pseudocode listing of a process for merging nodes to generate a meta-node used in the processes of FIG. 2-FIG. 3 and FIG. 7-FIG. 8.

DETAILED DESCRIPTION

Figure 1:
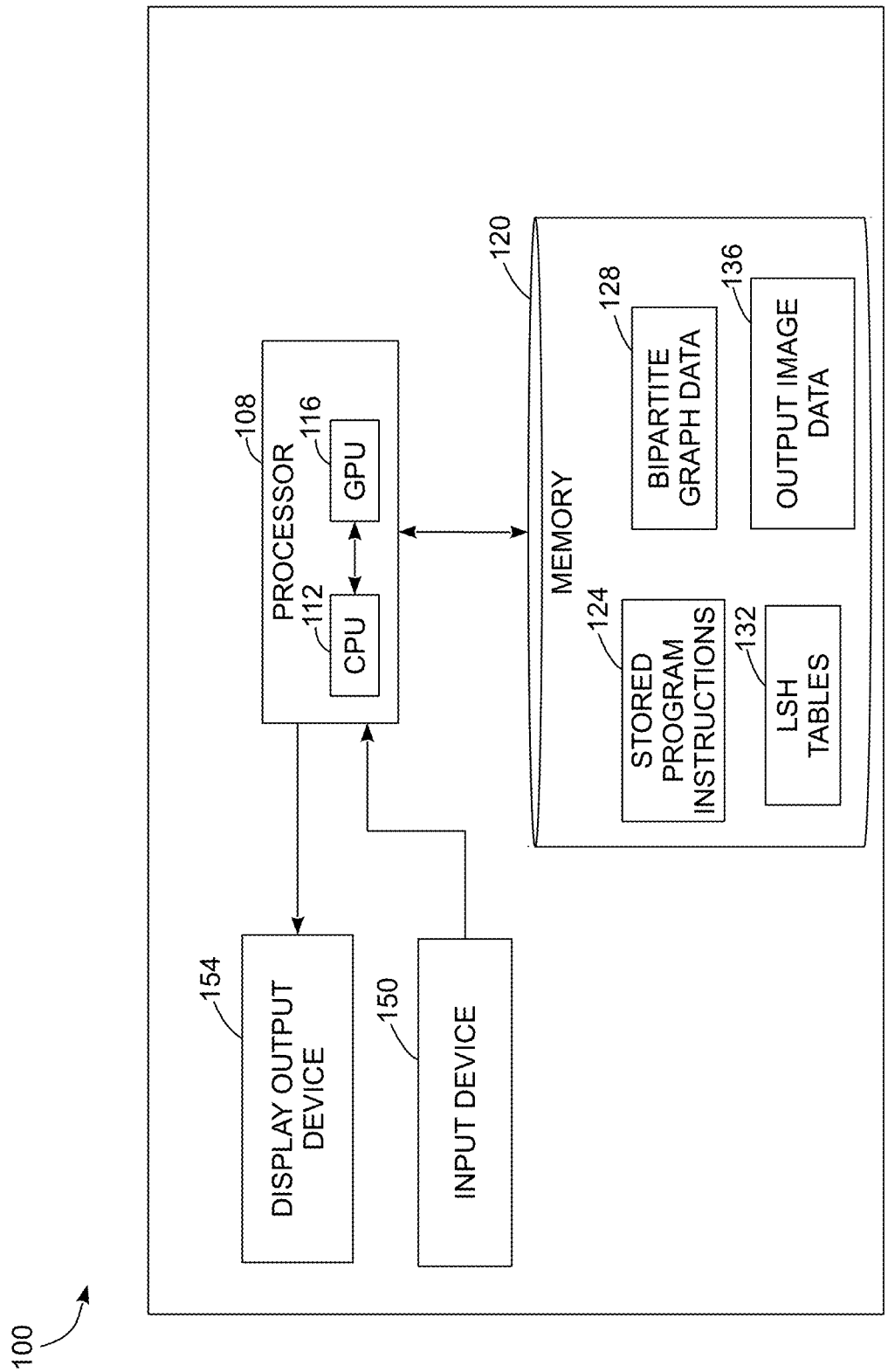
FIG. 1 is a schematic diagram of a system that generates graphical depictions of summarized bipartite graphs.

For the purposes of promoting an understanding of the principles of the embodiments disclosed herein, reference is now be made to the drawings and descriptions in the following written specification. No limitation to the scope of the subject matter is intended by the references. This disclosure also includes any alterations and modifications to the illustrated embodiments and includes further applications of the principles of the disclosed embodiments as would normally occur to one skilled in the art to which this disclosure pertains.

As used herein, the term "bipartite graph" refers to a data structure that includes two distinct sets of elements, which are referred to as "nodes" and a set of edges that connect nodes between the first set and the second set. The first set of nodes and the second set of nodes in a bipartite graph are disjoint, which means that no two nodes in the first set are connected together directly by an edge and no two nodes in the second set are connected together directly by an edge. Instead, the only edge connections in the bipartite graph are between nodes in the first set and the second set. In some instances, a single node in the first group is connected to multiple nodes in the second group, and vice versa. Additionally, some bipartite graphs may include nodes in either or both of the first set and the second set that are not connected to any node in the other set. Stated more formally, bipartite graphs are equivalent to two-colorable graphs where the two sets of nodes each correspond to a different "color". All acyclic graphs, which are graphs in which the edges cannot be traversed in a cycle to return to a node graphs, are bipartite. A cyclic graph, which is a graph where traversing two or more edges can return to the same node cyclically, is bipartite if and only if all of the cycles in the graph are of even length (e.g. cycles of 2N edges for N=1, 2, 3, 4, 5, . . . ).

As used herein, the term "meta-node" refers to a type of node in a summarized bipartite graph that includes at least one of the nodes from the original bipartite graph and may include two or more nodes that are both part of one set in the original bipartite graph. Each meta-node that includes nodes in a first set that are connected to other nodes in a second set is connected to at least one other meta-node in the second set to provide a simplified graphical display of the nodes and connections between nodes in the bipartite graphs using the meta-nodes to provide a summary of original bipartite graph, even if the summary includes some inaccuracies when compared to the original bipartite graph. While not expressly shown in the examples below, a summarized graph may include a meta-node that is formed from nodes in one set that are not connected to any of the nodes in the other set if the original bipartite graph includes nodes in one set that are not connected to any nodes in the other set. As described in more detail below, the generation of the meta-nodes is also referred to as a "partitioning" process applied to the original set of nodes in the bipartite graph because each of the original nodes is eventually assigned to one and only one meta-node in a graphical depiction of a summary of the original bipartite graph, so the meta-nodes effectively separate or "partition" groups of nodes from the original bipartite graph. Unless otherwise specified herein, a reference to a node or operation performed on a node is equally applicable to a meta-node since the meta-nodes are a type of node.

Figure 4:
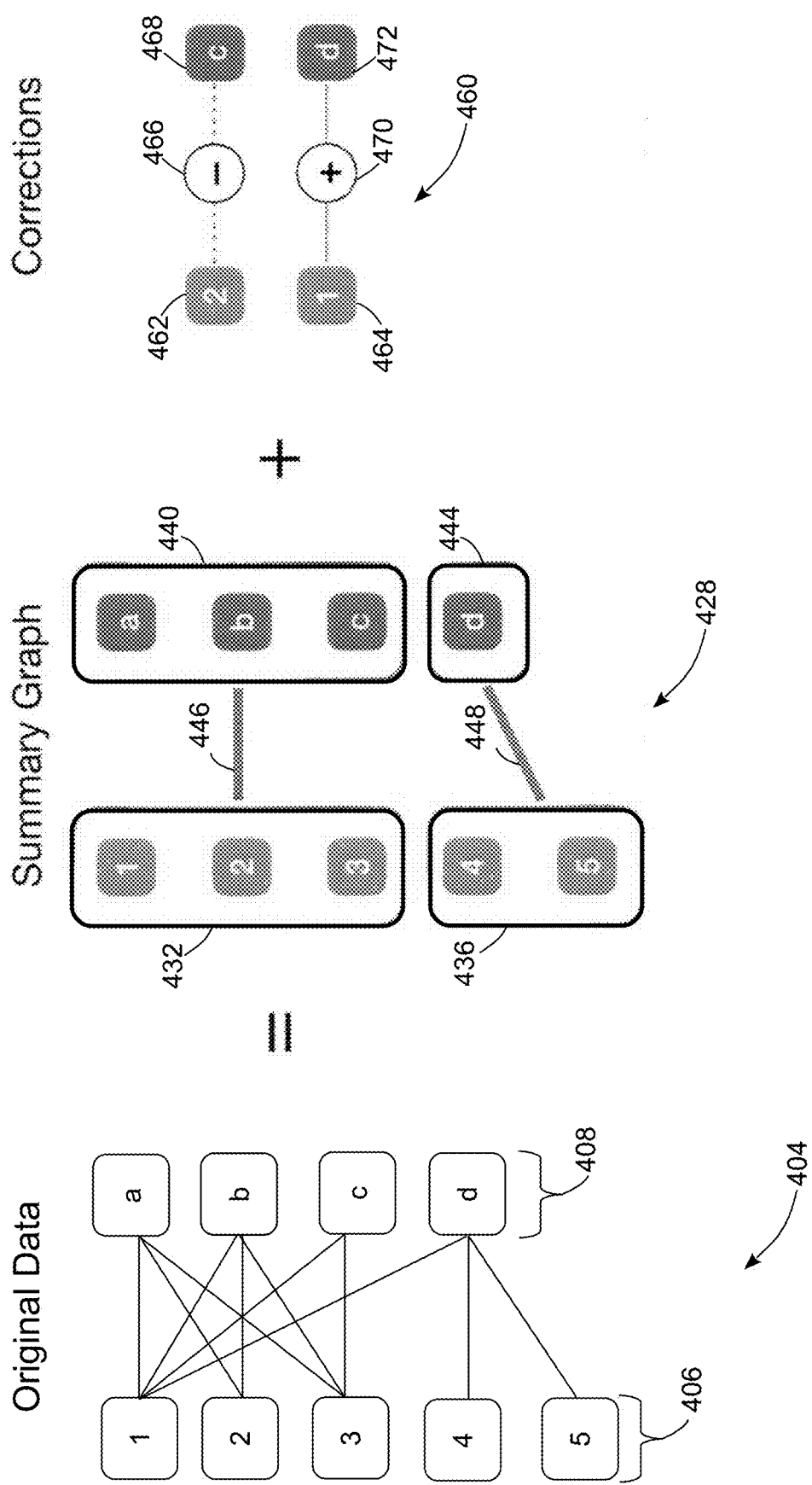
FIG. 4 is an example of a bipartite graph with a graphical depiction of a summary graph and corrections to the summary graph.

As used herein, the term "neighbor" has two different meanings denoting relationships between nodes and meta-nodes in a bipartite graph. Two nodes in the same set of a bipartite graph are never connected together directly via an edge, but these nodes may be Two nodes that are neighbors of each other within a set can also be referred to as "indirect neighbors," and "in-set neighbors." The term "two-hop neighbors" refers to a class of in-set neighbor nodes that are connected indirectly by edges that each connect to a single node in the other set, which requires "two hops" over two edges to travel between the in-set neighboring nodes. As depicted in FIG. 4, nodes 4 and 5 in set 406 are in-set neighbors since they are indirectly connected by edges to node din set 408. The nodes 4 and 5 are also two-hop neighbors since the nodes can be connected by traversing two edges (e.g. 4→d→5 or vice versa). The term "neighbor" can also refer to nodes (or meta-nodes) in two different sets that are connected by an edge in the bipartite graph. Connected nodes in two different sets are referred to as "direct neighbors".

FIG. 1 is a schematic diagram of a system 100 for generation of graphical depictions of a bipartite graph. The system 100 generates graphical depictions of bipartite graphs with reduced clutter using the methods described herein. The system 100 includes a processor 108 that is operatively connected to a memory 120, input device 150, and a display output device 154. As is described in more detail below, during operation, the system 100 receives the bipartite graph data from the memory 120 or another source, generates an output graphical depiction of a summary of the bipartite graph data based on a minimum description length optimization process to that reduces clutter in the original bipartite graph, and optionally generates an output graphical depiction of a correction graph that provides corrections to errors, if any, that may be introduced in the summary graph.

In the system 100, the processor 108 includes one or more integrated circuits that implement the functionality of a central processing unit (CPU) 112 and graphics processing unit (GPU) 116. In some embodiments, the processor is a system on a chip (SoC) that integrates the functionality of the CPU 112 and GPU 116, and optionally other components including the memory 120, network device 152, and positioning system 148, into a single integrated device, while in other embodiments the CPU 112 and GPU 116 are connected to each other via a peripheral connection device such as PCI express or another suitable peripheral data connection. In one embodiment, the CPU 112 is a commercially available central processing device that implements an instruction set such as one of the x86, ARM, Power, or MIPS instruction set families. The GPU 116 includes hardware and software for display of at least two-dimensional (2D) and optionally three-dimensional (3D) graphics. In some embodiments, processor 108 executes software programs including drivers and other software instructions using the hardware functionality in the GPU 116 to accelerate generation and display of the graphical depictions of bipartite graph summaries and corrections that are described herein. During operation, the CPU 112 and GPU 116 execute stored programmed instructions 124 that are retrieved from the memory 120. The stored program instructions 124 include software that control the operation of the CPU 112 and the GPU 116 to generate graphical depictions of bipartite graphs based on the embodiments described herein. While FIG. 1 depicts the processor 108 including the CPU 112 and GPU 116, alternative embodiments may omit the GPU 116 since in some embodiments the processor 108 in a server generates output image data files 136 using only a CPU 112 and transmits the output image data files 136 to a remote client computing device that uses a GPU and a display device to display the image data. Additionally, alternative embodiments of the processor 108 can include microcontrollers, application specific integrated circuits (ASICs), field programmable gate arrays (FPGAs), digital signal processors (DSPs), or any other suitable digital logic devices in addition to or as replacements of the CPU 112 and GPU 116.

In the system 100, the memory 120 includes both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random access memory (RAM) that stores software programmed instructions 124 and data, including bipartite graph data 128, locality-sensitive hash (LSH) tables 132, and output image data of the graph summary and correction images 136, during operation of the system 100. In some embodiments the CPU 112 and the GPU 116 each have access to separate RAM devices (e.g. a variant of DDR SDRAM for the CPU 112 and a variant of GDDR, HBM, or other RAM for the GPU 116) while in other embodiments the CPU 112 and GPU 116 access a shared memory device.

The memory 120 stores the bipartite graph data 128 in any suitable format including, for example, a data file format that is designed for storing graph information such as the DOT graph description language format, the graph modeling language (GML), various extensible markup language (XML) based formats including, but not limited to, GraphXML, GraphML, Graph Exchange Language (GXL), Extensible Graph Markup and Modeling Language (XGMML), and any other suitable data format that encodes the data for the nodes in the two sets of the bipartite graph and the edges that connect the nodes in the two sets together.

The memory 120 optionally stores the LSH tables 132 that the processor 108 generates based on the bipartite graph data 128. In the embodiment of FIG. 1, the memory 132 stores two separate LSH tables that each correspond to one set of data in the bipartite graph data. As described in further detail below, the LSH tables enable the system 100 to identify in-set neighbors of a node or meta-node that have a high degree of similarity using a Jaccard similarity index. This enables computationally efficient identification of the neighboring nodes that have the highest probability of being suited for generating meta-nodes in a summary graph, which improves the computational performance of the system 100 and is particularly beneficial for large and densely connected bipartite graphs. As described below, however, in some embodiments the system 100 does not utilize the LSH tables 132, and in these embodiments the memory 120 does not need to store the LSH tables 132.

In the memory 120, the output graph summary and graph correction image data 136 includes one or more sets of image data that the system 100 generates to produce a graphical output of a summary of the bipartite graph and optionally a graphical depiction of corrections to the bipartite graph. In some embodiments, the processor 108 generates the output image data 136 using a rasterized image format such as JPEG, PNG, GIF, or the like while in other embodiments the processor 108 generates the output image data 136 using a vector image data format such as SVG or another suitable vector graphics format.

In the system 100, the input device 150 includes any devices that enable the system 100 to receive the bipartite graph data 128. Examples of suitable input devices include human interface inputs such as keyboards, mice, touchscreens, voice input devices, and the like. Additionally, in some embodiments the system 100 implements the input device 150 as a network adapter or peripheral interconnection device that receives the bipartite graph data from another computer or external data storage device, which can be useful for receiving large sets of bipartite graph data in an efficient manner.

In the system 100, the display output device 154 includes an electronic display screen, projector, printer, or any other suitable device that reproduces a graphical display of the summary graph and the correction graph that the system 100 generates based on the bipartite graph data. While FIG. 1 depicts the system 100 implemented using a single computing device that incorporates the display output device 154, other embodiments of the system 100 include multiple computing devices. For example, in another embodiment the processor 108 generates the output image data 136 as one or more image data files that depict the summary graph and graph correction and the processor 108 transmits the image data files to a remote computing device via a data network. The remote computing device then displays the graphical files, and in this embodiment the processor 108 is operatively connected to the display device in the remote client computing device indirectly instead of via the direct connection that is depicted in FIG. 1. In one non-limiting example, the processor 108 is implemented in a server computing device that executes the stored program instructions 124 to implement a web server that transmits the output image file data 136 to a web browser in a remote client computing device via a data network. The client computing device implements a web browser or other suitable image display software to display the output graph image data 136 received from the server using a display output device 154 that is integrated into the client computing device.

Figure 2:
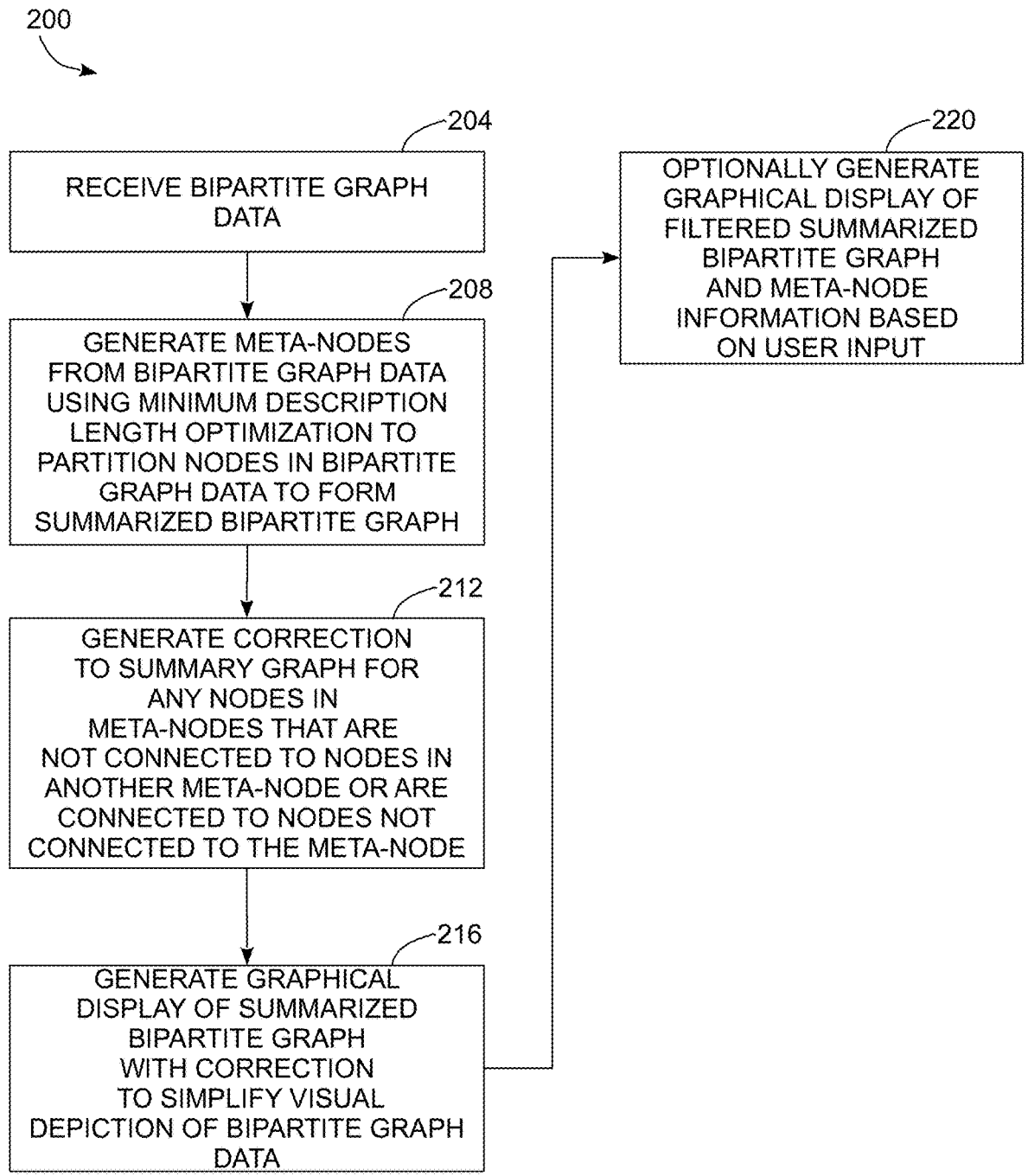
FIG. 2 is a block diagram of a process for generating graphical depictions of summarized bipartite graphs.

FIG. 2 depicts a process 200 for generating graphical depictions of bipartite graph data including summary graphics and optionally correction graphics that enables graphical display of the bipartite graph with reduced clutter. In the description below, a reference to the process 200 performing a function or action refers to the operation of a processor to execute stored program instructions to perform the function or action in association with other components in a graphical display system. The process 200 is described in conjunction with the system 100 of FIG. 1 for illustrative purposes.

The process 200 begins as the processor 108 in the system 100 receives bipartite graph data (block 204). The bipartite graph data further includes a first set including a first plurality of nodes, a second set including a second plurality of nodes, and a plurality of edges that connect the first set of nodes to the second set of nodes. Each edge in the plurality of edges connects one node in the first plurality of nodes to another node in the second plurality of nodes, and as described above the edges in the bipartite graph data only form connections between nodes in the first set and the second set, so no edges directly connect nodes in the first set together or nodes in the second set together. In the system 100, the processor 108 receives the bipartite graph data 128 from the memory 120 or from an input device 150.

FIG. 4 depicts bipartite graph data in an illustrative example of a bipartite graph 404. The bipartite graph 404 includes a first set of nodes 406 including nodes 1 to 5 and a second set of nodes 408 with nodes a to d. A plurality of edges connects the nodes of the first set and the second set together, with different nodes have different numbers of edge connections. While the bipartite graph 404 is comparatively small to present a simplified illustrative example, even this graph depicts a complex and cluttered set of relationships between the nodes 1 to 5 in the first set 406 and the nodes a to d in the second set 408 with edges that cross each other and make analysis of the graph more difficult. Larger bipartite graphs that are often used in practical applications exacerbate the problems depicted in FIG. 4. The system 100 implements the process 200 to generate the graphical depiction of the summarized graph 428 and the graphical depiction of the correct graph 460 to provide a graphical output that presents the bipartite graph data in a form that presents the bipartite graph data with reduced cluttering as is further described below.

Referring again to FIG. 2, the process 200 continues as the processor 108 in the system 100 generates meta-nodes in each of the first set of nodes and the second set of nodes of the bipartite graph data (block 208). For example, the processor 108 generates a first meta-node including at least two nodes in the first plurality of nodes and a second meta-node including at least two nodes in the second plurality of nodes based on the bipartite graph data using a minimum description length (MDL) optimization process to generate the first meta-node and the second meta-node, although as described herein some meta-nodes may be formed from a single node in the original bipartite graph data.

The minimum description length optimization refers to a process that enables the generation of meta-nodes to produce a visual depiction of a summary of the graph that greatly reduces the clutter from the original bipartite graph, even if the graphical depiction of the summary is not a perfectly accurate depiction of the original bipartite graph data. As described below, the processor 108 in the system 100 identifies a "description length" property of nodes in the graph and generates meta-nodes that minimize the total description length by combining multiple nodes into meta-nodes where appropriate. Of course, a trivial process simply groups every node in the first set into a single meta-node and every node in the second set into a second meta-node with a single edge. However, outside of special circumstances such as a completely or almost completely connected graph, the overly simplistic process also produces so many errors in the representation of connections between individual node that the summary graph may be of limited use. Consequently, the MDL optimization process also describes the description length incorporating the required corrections to prevent the summary graph from including too many errors that are potentially produced by aggregating nodes in to larger meta-nodes to generate meta-nodes. Thus, in the process 200 the system 100 generates meta-nodes with description lengths that balance the benefits of forming meta-nodes from individual nodes to reduce clutter in graphical depictions of the graph and smaller meta-nodes while avoiding the production of too many errors by grouping too many nodes into each meta-node.

In the MDL optimization process, the description length is set forth generally as: $L(D)=L(M)+L(D|M)$ where L is a final numeric value of a description length, M is a model which refers to the simplified summary bipartite graph formed from meta-nodes, and D represents the original data. D|M represents a difference of the data from the model, which is the information in the data besides what is already captured by the model, which corresponds to the corrections that are described below. L(M) is the description length of the model, and L(D|M) is the description length of the data's difference from the model. For generating meta-nodes in a bipartite graph, a more specific description of the model M is based on minimizing the total description length of the meta-nodes that form the summarized version of the original bipartite graph data and any potentially required corrections. The original bipartite graph is described as $R \subseteq U \times V$ where U represents the first set of nodes, V represents the second set of nodes, and x represents the edges that connect the nodes in the sets U and V. The MDL optimization process forms the partitions corresponding to meta-nodes P (for the nodes in set U) and Q (for the nodes in set V) that partition the original nodes from U and V into meta-nodes to minimize the total description length: $L(P,Q)=L(R^c)+L(C)$ where $R^c$ is the summary graph that corresponds to a bipartite sub-graph within the overall graph R that includes the connections between the partitioned meta-nodes: $R^c \subseteq P \times Q$. The term C refers to the corrections that are required to produce a fully accurate representation of the original bipartite graph from the summary $R^c$ where C is described as: $C=(\cup_{(p,q)\in R^c} p \times q) \oplus R$.

The description length of the meta-nodes in the summary graph can also be expressed as $L(R^c) \propto \|R^c\|$, which corresponds to the total number of edges that connect meta-nodes in the summary graph instead of the total number of edges between the individual nodes from the original bipartite graph. The description length of the corrections is: $L(C) \propto \|C\|$. A practical embodiment of the MDL optimization process uses two empirically determined parameters $\alpha$ and $[\beta_p, \beta_q]$ to provide the system 100 with control over how heavily the MDL process should favor producing larger partitions and meta-nodes at the potential cost of additional corrections or reducing the number of corrections required at the potential cost of increasing the number of meta-nodes in the summary graph. The total description length for the summary graph with the partitioned meta-nodes is set forth as: $L(P,Q)=\|R^c\|+\alpha\|(\cup_{(p,q)\in R^c} p \times q) \oplus R\|+\beta_p\|P\|\beta_q\|Q\|$. Thus, the MDL process to minimizes the total description length to provide a balance between a simplified summary graph and corrections to the summary graph.

FIG. 3 and FIG. 7-FIG. 10 depict the MDL optimization process 300 that the system 100 uses to generate the meta-nodes as part of the process 200 in greater detail. FIG. 7 depicts a process 700, which is an embodiment of the process 300 that uses the two-hop neighbor search process to identify in-set neighbor nodes in more detail. FIG. 8 depicts a process 800, which is another embodiment of the process 300 that uses the LSH tables 132 to identify in-set neighbor nodes in more detail. In the description below, a reference to the process 300 performing a function or action refers to the operation of a processor to execute stored program instructions to perform the function or action in association with other components in a graphical display system. The process 300 is performed iteratively to partition the original sets of nodes in the bipartite graph data into meta-nodes that grow over a series of iterations until the system 100 produces a summary graph with a minimized description length. The process 300 is described in conjunction with the system 100 of FIG. 1 for illustrative purposes.

Figure 3:
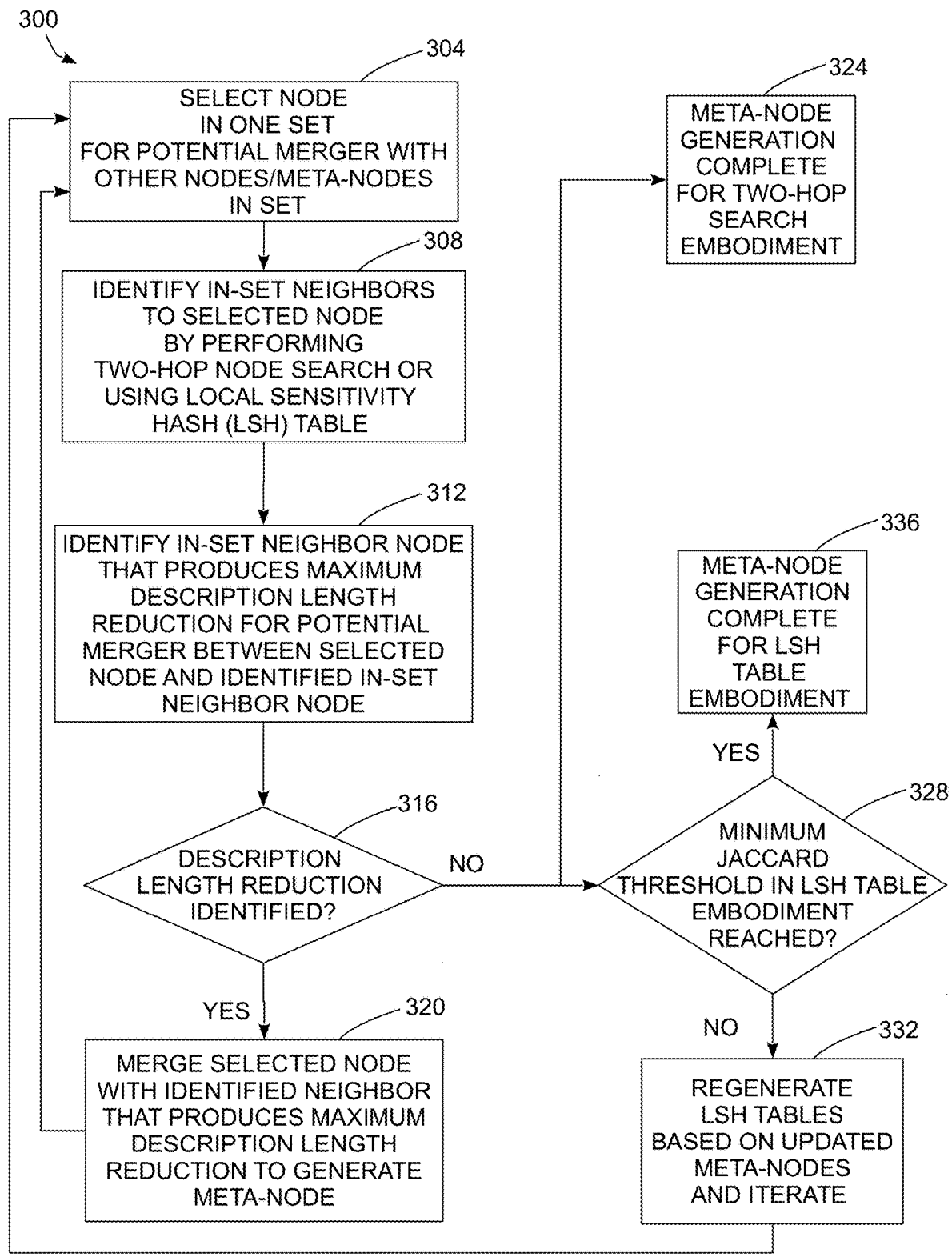
FIG. 3 is a block diagram of a process for generating meta-nodes in the summarized bipartite graphs during the process of FIG. 2.

The process 300 begins as the processor 108 selects a node from one set of the bipartite graph (block 304), which can be one of the nodes from the original bipartite graph data or a meta-node that has been generated during a prior iteration of the process 300. In the embodiment of FIG. 3, the processor 108 selects the node at random.

The process 300 continues as the processor 108 identifies the in-set neighbors of the selected node using either a two-hop search process or by searching for neighbors with a Jaccard similarity index that exceeds a predetermined value using the LSH tables 132 in the memory 120 (block 308). In the two-hop search process embodiment, which is also depicted in the process 700 of FIG. 7, the processor 108 identifies each node in a plurality of in-set neighbor nodes by identifying a second node in the second set that is connected to the first node by a first edge in the bipartite graph data, and identifying at least one node as an in-set neighbor in the first set that is connected to the second node by a second edge in the bipartite graph data. For example, in FIG. 4, the processor 108 identifies the nodes a and b in the second set 408 that are connected to the selected node 2 by edges in the bipartite graph data (this is the "first" hop). The processor 108 then identifies in-set neighbors of the node 2 by identifying the other nodes in the first set 406 that are also connected to the nodes a and b in the second set (this is the "second" hop). For this example, the neighbors identified in the two-hop process are nodes 1 and 3, which are both connected to nodes a and b.

The two-hop search process described above identifies every in-set neighbor node of the selected node. However, in large bipartite graphs the two-hop search process can consume considerable processing resources both to perform the search and because the two-hop search identifies every in-set neighbor that meets the two-hop criterion, and in many instances a large number of the in-set neighbors will not produce a noticeable decrease in the description length if merged with the selected node. In the embodiment of the system 100 and the process 300 that uses the LSH tables 132, which is also depicted in the process 800 of FIG. 8, the processor 108 identifies the in-set neighbor nodes using the LSH table for the set to retrieve Jaccard index values from the LSH when supplied with the selected node. The LSH tables 132 store similar sets (in terms of Jaccard index) into the same entry in the LSH table with high probability. The processor 108 can query the LSH table 132 to identify candidate nodes that are similar to the selected node that is used as the basis of the query in a constant-time (O(I)) search operation, which is more computationally efficient than the two-hop search process described above.

The Jaccard index for two different sets U and V (such a selected node or meta-node compared to subsets of potential indirect neighbor nodes in the bipartite graph) is defined as:

$$JaccardIndex(U, V) = \frac{\|U \cap V\|}{\|U \cup V\|}.$$

The Jaccard index values are typically in a predetermined numeric range (e.g. 0.0 to 1.0) that are related to the number of common neighbors between the selected node and each of the other nodes in the same set. For example, in the bipartite graph data 404 of FIG. 4, the Jaccard index between nodes 3 and 2 is lower than the corresponding Jaccard index between nodes 3 and 1 because nodes 3 and 2 are connected to only two common nodes in the second set 408 (nodes a and b) while nodes 3 and 1 are connected to three common nodes in the second set 408 (nodes a, b, and c). The processor 108 generates the LSH tables to enable an efficient search operation to identify only neighboring nodes that have a Jaccard index that exceeds a predetermined threshold value, which in turn generally produces the largest reductions in the description length when the nodes are merged as is described in further detail below. During the process 300 the threshold value starts out with a high initial value to only identify neighbors with the highest Jaccard index values that indicate the highest levels of similarity to the selected node to form the earliest meta-nodes, and the processor 108 gradually reduces the threshold value over subsequent iterations of the process 300 until all of the meta-nodes in the summary graph are generated.

As described above, the processes 700 and 800 are embodiments of the process 300 that the system 100 implements to identify in-set neighbor nodes of the randomly selected node. Both of the processes 700 and 800 also use the neighbors function described in both the processes 700 and 800 refers to a function that the processor 108 implements to identify the direct neighbors between the selected node in one set of the bipartite graph and the edge-connected nodes in the other set, such as identifying the direct neighbors of node 2 in the set 406 of FIG. 4 as being nodes a and b that are connected to node 2 via edges in the bipartite graph data 404.

The process 300 continues as the processor 108 identifies a plurality of changes in description length that are produced by merging the selected node with each node in the plurality of neighbor nodes and identifies one node in the plurality of neighbor nodes that produces the largest reduction in the description length to be merged with the selected node as part of the MDL optimization process (block 312). The total change in description length $\Delta L$ is based on how many edges can be eliminated by merging two nodes together and in how many errors are introduced by merging the two nodes. FIG. 9 depicts the function cost_reduction_for_bundling 900 that the processor 108 performs to identify each change in the description length that is produced by merging ("bundling") the first node with one of the identified in-set neighboring nodes. The result of cost_reduction_for_bundling is $\Delta L$ and the processes 700 and 800 of FIG. 7 and FIG. 8, respectively, use the cost_reduction_for_bundling function to identify a maximum description length reduction value $\Delta L_{max}$. As described above, the processor 108 identifies the in-set neighboring node ($q_{max}$) that produces the largest reduction in the description length that is associated with the maximum reduction value of $\Delta L_{max}$ in the MDL optimization process.

During process 300, if the $\Delta L_{max}$ is greater than 0, which indicates that a reduction to the description length occurs in response to a merger of the selected node and the identified neighbor node that produces $\Delta L_{max}$ (block 316), then the processor 108 merges the two nodes together to form a meta-node (block 320). FIG. 10 depicts the function merge 1000 that the processor 108 performs to merge the selected node and the identified in-set neighbor node that produce the largest reduction in the description length $\Delta L$, either or both of which could already be meta-nodes containing multiple nodes, together. As described above, in some instances one or both of the nodes being merged is already a meta-node, in which case the generated meta-node includes all of the individual nodes from the original bipartite graph that are included in any of the merged meta-nodes.

The process 300 continues as described above in the processing of blocks 304-320 until the processor 108 identifies that the maximum description length $\Delta L_{max}$ is either 0 or a negative value, which indicates that the most optimal merger between nodes either produces no reduction in description length or actually increases the description length (block 316). In the embodiment of the process 300 that uses the two-hop neighbor search that is also depicted in more detail in the process 700 of FIG. 7, the process 300 is completed when $\Delta L_{max}$ no longer produces a reduction in the description length (block 324). In the embodiment of the process 300 that uses the LSH tables and the Jaccard index threshold to identify neighboring nodes, the processor 108 continues the process 300 if the minimum Jaccard threshold ($th_{cutoff}$ in the process 800 of FIG. 8) has not been reached (block 328). The processor 108 regenerates new LSH tables for both sets of nodes to incorporate the meta-nodes from the previous iterations of the process 300 (block 332) and continues to generate meta-nodes until the minimum Jaccard index threshold is reached (block 328) and the process 300 has completely generated the meta-nodes for the summary graph (block 336).

The meta-nodes generated in the process 300 provide partitions to the original nodes from the bipartite graph data 128 with a reduced number of edges connecting the meta-nodes compared to the original bipartite graph. FIG. 3 depicts a simplified version of the process 300 for a single set of data in the bipartite graph for illustrative purposes, but in the system 100 the processor 108 performs the process 300 for both sets of data to partition the nodes and generate the meta-nodes in both sets of the bipartite graph to produce the summary graph. As depicted in FIG. 4, the meta-node 432 corresponds to one partition that includes the nodes 1, 2, and 3 while the meta-node 436 corresponds to another partition that includes the nodes 4 and 5. Each node from the original bipartite graph 404 is included in only one meta-node, even if the meta-node only includes a single node, such as the meta-node 444 that only includes the single node d.

Referring again to FIG. 2, the process 200 continues as the system 100 generates corrections, if any, to the summary graph based on the contents and the connections of the generated meta-nodes from the summary graph and the original bipartite graph data 128 (block 212). The correction to the summary graph provides corrections for two potential types of error in the summary graph that are described in further detail below.

The first type of error occurs in a situation in which at least one node in a first meta-node in the first set is not connected to at least one other node in a second meta-node of the second set in the original bipartite graph data even though the two meta-nodes are connected to each other in the summary graph. Using FIG. 4 as an example, node 2 in set 406 of the original bipartite graph 404 is not connected to node c in the set 408. However, in the graphical depiction of the summarized graph 428, node 2 is part of meta-node 432 and node c is part of meta-node 440, which are connected by edge 446. While the graphical depiction of the summarized graph 428 accurately depicts the connection of node 2 to nodes a and b, the connection to node c is an error.

The second type of error occurs in a situation in which at least one node in a first meta-node in the first set is connected to at least one other node in a second meta-node of the second set in the original bipartite graph data although the two meta-nodes are not connected to each other in the summary graph. Using FIG. 4 as an example, node 1 in set 406 is connected to node d in set 408 in the original bipartite graph 404, but the meta-node 432 that includes node 1 in the graphical depiction of the summarized graph 428 is not connected to the meta-node 444 that includes node d. The system 100 identifies both types of errors in the summary graph by comparing the final contents and edge connections of the meta-nodes in the summary graph to the original bipartite graph data 404 to identify the errors.

The process 200 continues as the system 100 generate the graphical depictions of the summary graph and the corrections to the summary graph concurrently in a single graphical depiction or in separate graphical depictions to provide a summarized display of the bipartite graph data (block 216). In the system 100, the processor 108 generates a graphical depiction of the summarized graph with at least a first meta-node from the first set and a second meta-node from the second set of the original bipartite graph data being connected together by a single edge in the summary graph. As depicted in more detail below, the system 100 performs the process 200 to generate graphical depictions of summarized bipartite graphs that typically include multiple meta-nodes in each set to depict complex bipartite graphs with greatly reduced levels of visual clutter.

FIG. 4 depicts one embodiment of the graphical depiction of the summarized graph 428. The graphical depiction of the summarized graph 428 includes a specific depiction of the meta-nodes 432, 436 in the first set and the meta-nodes 440 and 444 in the second set. The processor 108 generates the graphical depiction of each meta-node in FIG. 4 using a bounding rectangle that provides a clear visual indication that the nodes within each meta-node (e.g. nodes 1, 2, and 3 in the meta-node 432) each belong to a single meta-node. While the graphical depiction of the summarized graph 428 includes a separate graphical element that identifies each of the individual nodes 1-5 in the first set and a-d in the second set, the processor 108 optionally omits identifiers for individual nodes or produces a summarized graphical identifier for the individual nodes in larger graphs where meta-nodes may include a large number of individual nodes.

As depicted in FIG. 4, the processor 108 also generates graphics for the edges 446 and 448 that connect the meta-node pairs 432←→440 and 436←→444, respectively. Each pair of meta-nodes is connected by a single edge, which greatly reduces the visual clutter of a standard bipartite graph representation even in the comparatively simple example of FIG. 4. In the graphical depiction of FIG. 4, the processor 108 generates a linear graphical edge element to depict the connection between the meta-nodes in the graphical depiction of the summarized graph 428.

Figure 5:
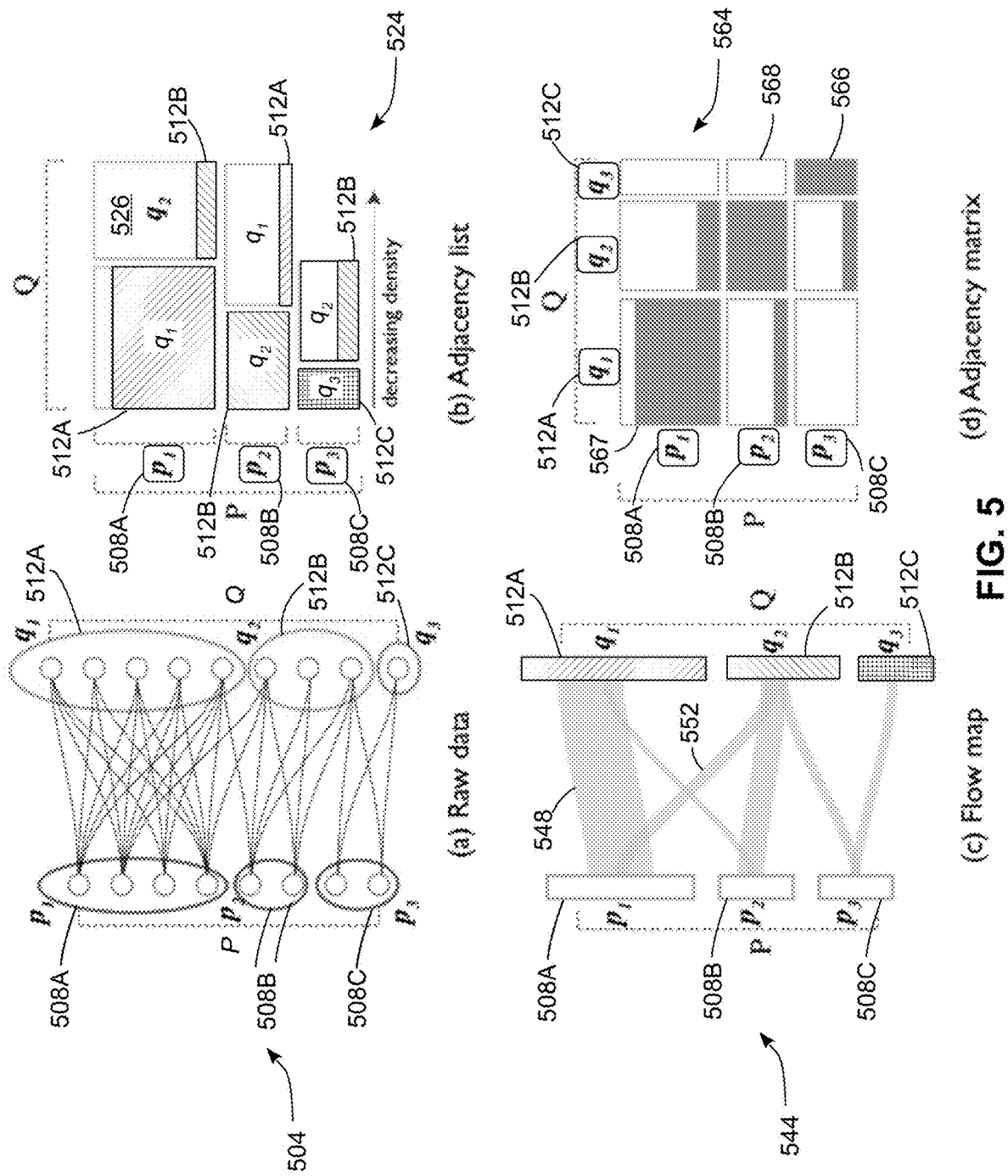
FIG. 5 is an example of another bipartite graph with additional examples of graphical depiction of a summary graphs and corrections to the summary graphs.

FIG. 5 depicts other embodiments of graphical depictions of summary graphs that the process 200 generates based on an original bipartite graph 504. FIG. 5 depicts the meta-nodes 508A ($p_1$) 508B ($p_2$) and 508C ($p_3$) in a first set P that are mapped to meta nodes 512A ($q_1$), 512B ($q_2$), and 512C ($q_3$) in a second set Q that the process 200 generates for the original bipartite graph 504 illustrative purposes, but the original bipartite graph data 504 do not include the meta-nodes since system 100 generates the meta-nodes during the process 200. FIG. 5 depicts three summarized bipartite graphs 524, 544, and 564 that different configurations of the system 100 generate during the process 200.

The summarized bipartite graph 524 is referred to as an "adjacency list" graph that arranges graphical elements depicting meta-nodes from one set (meta-nodes 508A-508C from set P) along either the vertical axis shown in FIG. 5 or the horizontal axis. The adjacency list summarization graph 524 then sorts and arranges the meta-nodes from the second set Q in a descending order of "density", between each the meta-node in the first set P in each row of the graph and the corresponding meta-nodes in the second set Q. The density refers to the total level of connectivity of the individual nodes between two meta-nodes. For example, the summarization graph 524 includes a row of entries for the meta-node 508A (p that depicts the meta-node 512A ($q_1$) first followed by the meta-node 512B ($q_2$) because as seen in the original bipartite graph 504, the individual nodes in meta-node 508A include a greater proportion of connections to the individual nodes in the meta-node 512B compared to the lower proportion of connections to the meta-node 512B. The maximum density level between two meta-nodes occurs in a graph where all of the individual nodes in both meta-nodes are connected together. In one embodiment, the system 100 breaks ties between sets of meta-nodes that have the same density by prioritizing the connection with the largest aggregate number of connected nodes (e.g. prioritize 3 total node connections vs. 2 total node connections even if both meta-nodes have the same density).

The system 100 displays the meta-nodes in each row of the summarization graph 524 with the more densely connected nodes displayed first, and two different rows of the summarization graph 524 may include graphical elements that depict meta-nodes with different ordering based on the connection density. For example, in another row that corresponds to the meta-node 508B, the summarization graph 524 depicts graphical elements for the meta-node 512B first followed by meta-node 512A, in reverse order from the row corresponding to the meta-node 508A, because the meta-node 508B has a higher density connection to the meta-node 512B compared to meta-node 512A.

As depicted in the summarization graph 524, each connection between two meta-nodes in the sets P and Q, if one is present in the original bipartite graph, is represented by a single graphical element, which are the rectangular graphical elements depicted in FIG. 5. Each graphical element is a single "edge" that depicts the connection between two meta-nodes using a single graphical element even though the precise visual indicator of FIG. 5 is a rectangle instead of the linear edges that are depicted in FIG. 4 and the summarized graph 544.

The adjacency list summarization graph 524 embodiment enables an efficient graphical display of "sparse" bipartite graphs that include large numbers of meta-nodes in the two sets that are not connected to each other while providing a compact visual representation of meta-nodes that actually are connected to one another. For example, because meta-nodes 508A and 508B are not connected to the meta-node 512C (q3) in the original bipartite graph data, the adjacency list summarization graph 524 does not include a graphical depiction of meta-node 512C in the row entries for either of the meta-nodes 508A or 508B to reduce visual clutter in the graph (the row for meta-node 508C depicts a graphical element for meta-node 512C).

In the adjacency list summarization graph 524, the graphical elements that represent individual meta-nodes from the second set Q can be labeled and color-coded to provide an easily understandable visualization of the relationships between meta-nodes in the sets P and Q. For example, the graphical elements that depict the meta-node 512B are each labeled with the meta-node name ($q_2$) and share the same color in all three rows of the summarization graph 524. While FIG. 5 depicts the summarization graph 524 with the meta-nodes of set P arranged in rows, another variant of the adjacency list summarized graph 524 arranges the meta-nodes from the second set Q along the horizontal or vertical axis and displays the meta-nodes from set P relative to the meta-nodes in set Q in a similar manner to the summarization graph 524. In some embodiments, the system 100 can generate visual depictions of both sets of nodes in two different adjacency list summarization graphs.

The summarized bipartite graph 544 is referred to as a "flow map" summarized graph that includes a similar structure to the summarized graph 428 of FIG. 4, although the flow map summarized graph 544 includes variable edge line thicknesses that depict the relative density levels of connectivity between meta-nodes. For example, the system 100 generates the graphical depiction of the flow map summarized graph 544 with a thicker edge 548 connecting the meta-nodes 508A and 512A (higher density) compared to the thinner edge 552 connecting the meta-nodes 508A and 512B (lower density) to depict the different relative density levels of the meta-node connections. The flow map summarized graph 544 optionally includes color coding of the meta-nodes in either or both of the sets P and Q.

The summarized bipartite graph 564 is referred to as an "adjacency matrix" graph that arranges the meta-nodes 508A-508C from the first set P along a vertical axis and the meta-nodes 512A-512C from the second set Q along the horizontal axis. In the adjacency matrix summarization graph 564, each graphical element provides a depiction of the connectivity density between two meta-nodes at an intersection between the two meta-nodes on the horizontal and vertical axes. For example, the graphical element 566 represents the connection between meta-nodes 508C and 512C and is located at the intersection of these meta-nodes in the summarization graph 564. The summarization graph 564 also includes filled, partially filled, and empty graphical elements to depict a single edge that represents different levels of connectivity density between meta-nodes. For example, the graphical element 566 is filled to indicate full connectivity between the nodes that form the meta-nodes 508C and 512C, the graphical element 567 is partially filled to indicate partial connectivity between the nodes that form the meta-nodes 508A and 512A, and the graphical element 568 is completely unfilled to indicate no connections between the meta-nodes 508B and 512C.

The system 100 also generates a graphical depiction of the corrections, if any corrections are needed, to the summary graph. FIG. 4 depicts one example of graphical depiction of corrections 460. The graphical depiction of the corrections 460 is shown separately from the graphical depiction of the summarized graph 428 in FIG. 4. In some embodiments, the display output device 154 produces the graphical depictions of the summary graph and the corrections simultaneously, while in other embodiments the display output device 154 generates the graphical depictions of the summary graph and the corrections separately to, for example, enable a user to review the summary graph and select individual meta-nodes to see the individual sets of corrections that are associated with each meta-node.

In more detail, the processor 108 generates the graphical depiction of the corrections 460 including a graphical depiction of a node 462 (node 2) in the first set and a node 468 (node c) in the second set with a graphical element 466 that indicates the first node 462 is not connected to the second node 468 to provide a display of a correction to the summarized display of the bipartite graph data. In FIG. 4, the graphical element 466 includes a minus sign ("−") that provides an easily understandable graphical indication that the nodes 462 and 468 are not connected to each other in the original bipartite graph data 404 even though the meta-nodes 432 and 440 in the graphical depiction of the summarized graph 428 that include these individual nodes are connected to each other. Additionally, the processor 108 generates graphics of the connecting lines between the node 462, graphical element 466, and the node 468 with dashes to provide a further indication that these nodes are not connected in the graphical depiction of the corrections 460.

The graphical depiction of the corrections 460 in FIG. 4 also includes a graphical depiction of a node 464 (node 1) from the first set and a node 472 (node d) from the second set with a graphical element 470 that indicates the node 464 is connected to the second node 472 to provide a display of another correction to the summarized display of the bipartite graph data. In this example, the nodes 464 and 472 are connected in the original bipartite graph data 404 but the meta-nodes 432 and 444 in the graphical depiction of the summarized graph 428 that include these individual nodes are not connected to each other. In FIG. 4, the graphical element 470 includes a plus sign ("+") that provides an easily understandable graphical indication that the nodes 464 and 472 are connected to each other in the original bipartite graph data 404. Additionally, the processor 108 generates graphics of the connecting lines between the node 464, graphical element 470, and the node 472 with solid lines to provide a further indication that these nodes are connected in the graphical depiction of the corrections 460.

FIG. 5 also depicts corrections that are incorporated directly into the graphical depiction of the summarized adjacency list graph 524 and the adjacency matrix graph 564. For example, in FIG. 5, some nodes in the meta-node 508A are connected to nodes in the meta-node 512B, but there are also numerous nodes in both of the meta-nodes 508A and 512B that are not connected to each other. To indicate the fact that the two meta-nodes 508A and 512B are not fully-connected, the processor 108 generates an un-filled section 526 in the rectangular depiction of the meta-node 512B in the row of the summarized graph 524 that corresponds to the meta-node 508A. The processor 108 fills the rectangular graphical depiction of each meta-node proportionally based on the connectivity density between the two meta-nodes, such as meta-nodes 508A and 512B, which provides implicit correction information to depict situations in which some nodes in two connected meta-nodes are not actually connected to each other in the original bipartite graph. The system 100 also generates the graphical depiction of the adjacency matrix graph 564 including partially filled elements to depict the density of the connections between meta-nodes and to provide correction information.

In some embodiments, the system 100 can receive user input from the input device 150 to select a graphical element from the summarization graph and generate a more detailed depiction of the corrections for the connections of individual nodes in the meta-nodes. For example in the adjacency list summarization graph 524, the system 100 receives an input via the input device 150 to select the graphical element of the meta-node 512B in the row corresponding to the meta-node 508A, which includes the un-filled region 526. The system 100 generates a more detailed graphical display of individual corrections for the nodes within the meta-nodes 508A and 512B that could, for example, be similar to the graphical depiction of the corrections that are shown above in FIG. 4.

As described above, in some embodiments, the processor 108 uses the display output device 154 to produce graphical depictions of the summary graph and any corrections for the summary graph that are generated during the process 200. In other embodiments, the processor 108 stores the rasterized or vector image data for the graphical depictions of the summary graph and the corrections in one or more images files with the image data 136 in the memory 120. As described above, the system 100 can retrieve and display the image data 136 or transmit the image data 136 to another computing device for display in a client-server or other distributed configuration.

Referring again to FIG. 2, in some embodiments of the process 200, the system 100 provides interactive functions to enable the user to modify the graphical display of the bipartite graph data after producing an initial display of the summarized bipartite graph data and corrections (block 220). In the system 100, the processor 108 receives user input via the input device 150 to adjust the display of the summary graph and correction information. One type of user input is a filter request that selects only a portion of the summary graph for display to further reduce the potential for clutter in complex bipartite graphs. For example, one filter criterion adjusts the display of the summary graph to only depict meta-nodes that have a sufficient level of connection density. In many instances, the meta-nodes with the highest density connections represent the most important nodes for analysis, and the filtering process enables display of the meta-nodes with the highest density levels. Another criterion is the total number of nodes that are included in a meta-node, which enables filtering to display the summary graph including the meta-nodes with the largest numbers of individual nodes without direct regard to the connection density (although the two filtering criteria may be related in some graphs). In the embodiment of FIG. 2, the system 100 generates updated graphics by either selecting a portion of the full summary graph for display based on the filter criteria or, in some instances, repeating the process 200 that is described above using only a subset of the original bipartite graph data 128 as an input to the process 200 to produce an updated graphical depiction of the summarized graph based on only a portion of the total bipartite graph.

Another type of user input is referred to as a "detail-on-demand" input in which the system 100 generates a graphical output including more detailed information about a portion of the bipartite graph. In one embodiment, the user uses a keyboard, mouse, touch screen, or other suitable input device 150 to select one or a subset of the meta-nodes in the graphical depiction of the summarized graph to receive a graphical display of additional detailed information pertaining to the selected meta-node. For example, in one embodiment the system 100 receives a mouse-over hover operation with a cursor that is placed on a meta-node as an input and generates a graphical tooltip to display the individual nodes in the first set and the individual nodes in the second set that are connected by the meta-node. This detailed display can also include a display of correction data to show detailed information about the original bipartite graph in greater detail.

In another embodiment, the system 100 receives a "split" request from a user to break up two connected meta-nodes into a smaller set of nodes to display the information in the two selected meta-nodes in greater detail. In this operation, the system 100 performs the process 200 a second time using only the nodes in the selected meta-nodes as inputs to produce another summary graph that includes a more detailed graphical depiction of the nodes that are included in the meta-nodes from the larger parent graph.

In addition to displaying the graphical depictions of the summarized bipartite graph and corrections, the system 100 can produce univariate charts for selected meta-nodes to provide detailed information about a portion of the information that is contained in the graphical display of the summarized bipartite graph. Examples of univariate charts include, for example, bar charts that depict categorical variables and binned histograms for numerical variables. The displayed univariate chart data changes based on the selected meta-nodes from the graphical display of the summarized chart.

Figure 6:
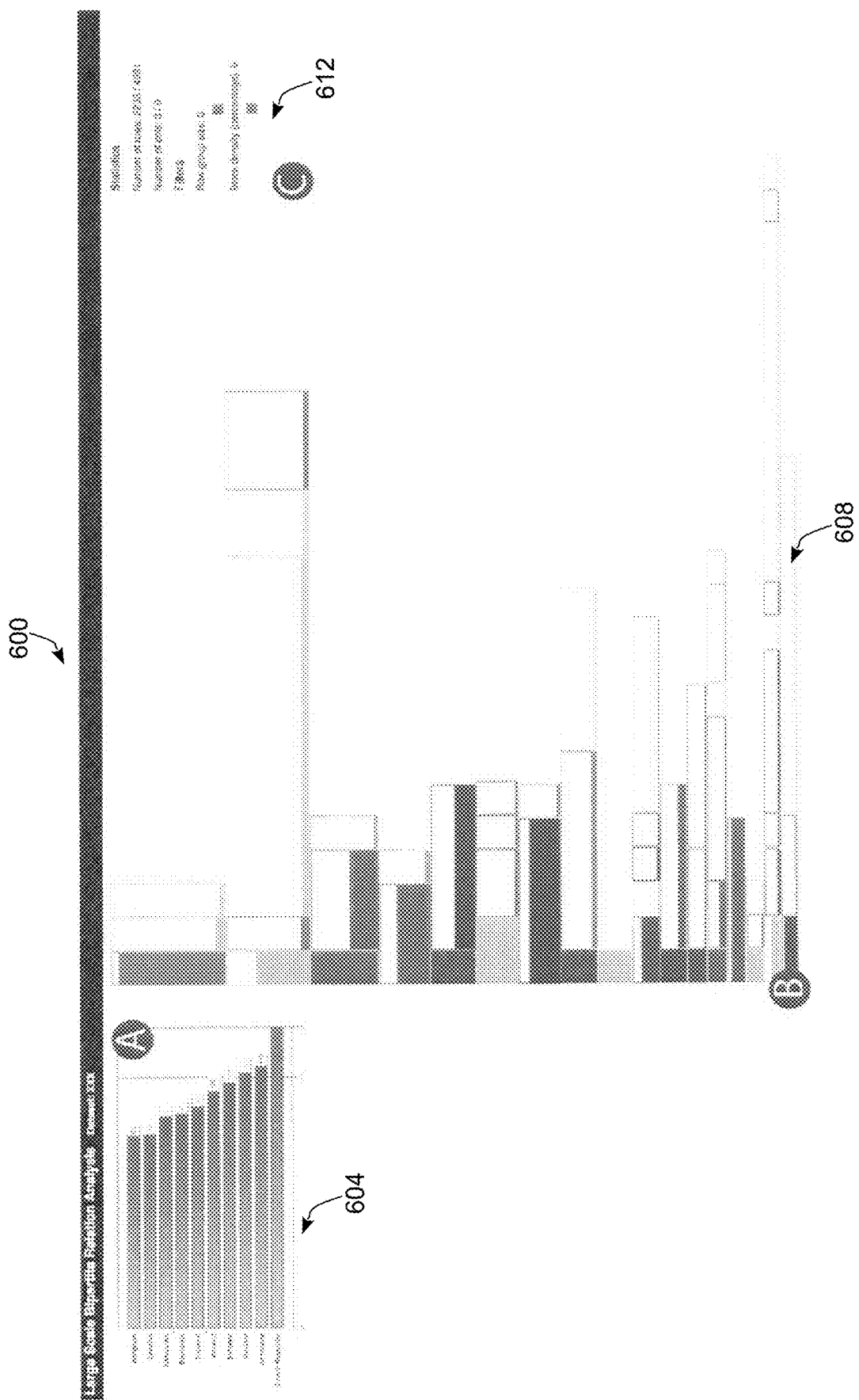
FIG. 6 is an example of a graphical depiction of a summary graph for a bipartite graph with controls to filter the summary graph.

FIG. 6 is an example of a display 600 of complex bipartite graph data that the system 100 generates in one embodiment of the process 200. The display 600 includes, for example, a histogram 604 that depicts the relative number of connections between nodes in one set (a set of country names in FIG. 6) to other nodes in the second set of a bipartite graph, which in the specific example of FIG. 6 is a bipartite graph that maps a set of vehicles to another set of fault events that occur during operation of the vehicles. FIG. 6 also includes a graphical depiction of a summary graph 608 that the system 100 generates in a manner that is similar to the embodiment of the adjacency list graph 524 of FIG. 5 that is shown above. As depicted in FIG. 6, the graphical depiction of the summarized graph 608 summarize the complex bipartite graph with a great reduction in visual clutter compared to a standard bipartite graph to solve the problem of the effective display of complex bipartite graphs. The display 600 also includes graphical user interface (GUI) controls 612 that enable the user to filter the summary graph based on, for example, the sizes of row groups and the density of the rectangles (blocks) that represent the connections between meta-nodes in the summary graph.

The embodiments described herein provide improvements to the operation of computer systems that generate graphical depictions of bipartite graphs. In particular, the embodiments described herein are directed to specific methods that implement rules to improve computer graphics technology by enabling the system 100 of FIG. 1 to perform a function not previously performable by a computer, namely the automated generation of graphical depictions of the bipartite graphs that reduce clutter and solve the problems with display of complex bipartite graphs that arise in the art. As described in the embodiments herein, these improvements can be implemented using software that is stored in a non-transitory memory and executed by a computer, hardware, or a combination of software and hardware.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for generating a graphical display of a bipartite graph comprising:
    receiving, with a processor, bipartite graph data, the bipartite graph data further comprising:
        a first set including a first plurality of nodes;
        a second set including a second plurality of nodes, the first set and the second set being disjoint; and
        a plurality of edges, each edge in the plurality of edges connecting one node in the first plurality of nodes to another node in the second plurality of nodes;
    generating, with the processor, at least one first meta-node including at least two nodes in the first plurality of nodes and at least one second meta-node including at least two nodes in the second plurality of nodes based on the bipartite graph data using a minimum description length (MDL) optimization process to generate the at least one first meta-node and the at least one second meta-node;
    generating, with the processor and a display output device, a first graphical depiction of the at least one first meta-node and the at least one second meta-node, the first graphical depiction including a single edge connecting the at least one first meta-node and the at least one second meta-node to provide a summarized display of the bipartite graph data;
    receiving, with a user interface, an input from a user; and
    modifying, with the processor, the first graphical depiction of the at least one first meta-node and the at least one second meta-node based on the input from the user.

2. The method of claim 1 further comprising:
    identifying, with the processor, a first node in the first at least one meta-node that is not connected to a second node in the at least one second meta-node based on the bipartite graph data; and
    generating, with the processor and the display output device, a second graphical depiction of the first node and the second node with a graphical element that indicates the first node is not connected to the second node to provide a display of a correction to the summarized display of the bipartite graph data.

3. The method of claim 1 further comprising:
    identifying, with the processor, a first node in the at least one first meta-node that is connected to a second node in the second set that is not present in the at least one second meta-node based on the bipartite graph data; and
    generating, with the processor and the display output device, a second graphical depiction of the first node and the second node with a graphical element that indicates the first node is connected to the second node to provide a display of a correction to the summarized display of the bipartite graph data.

4. The method of claim 1, the generating of the at least one first meta-node further comprising:
    selecting, with the processor, a first node in the first set;
    identifying, with the processor, a first plurality of neighboring nodes of the first node, each node in the plurality of neighboring nodes also being in the first set;
    identifying, with the processor, a first plurality of changes in description length that are produced by merging the first node with each node in the first plurality of neighbor nodes; and
    generating the first at least one meta-node by merging the first node with one node in the first plurality of neighbor nodes that produces a maximum reduction in the description length in the MDL optimization based on the first plurality of changes in the description length.

5. The method of claim 4, the identifying of the first plurality of neighbor nodes further comprising:
    identifying at least one node in the first plurality of neighbor nodes using a two-hop search process, the two-hop search process further comprising:
        identifying a second node in the second set that is connected to the first node by a first edge in the bipartite graph data; and
        identifying the at least one node in the first plurality of neighbor nodes in the first set that is connected to the second node by a second edge in the bipartite graph data.

6. The method of claim 4, the identifying of the neighbor nodes further comprising:
    identifying the first plurality of neighbor nodes using a locality-sensitivity hash (LSH) table, each of the first plurality of neighboring nodes having a Jaccard index value indicating similarity to the first node in the LSH table that exceeds a predetermined threshold.

7. The method of claim 4, the generating of the at least one second meta-node further comprising:
    selecting, with the processor, a second node in the second set;
    identifying, with the processor, a second plurality of neighboring nodes of the second node, each node in the second plurality of neighboring nodes also being in the second set;
    identifying, with the processor, a second plurality of changes in description length that are produced by merging the second node with each node in the plurality of neighbor nodes; and
    generating the at least one second meta-node by merging the second node with one node in the second plurality of neighbor nodes that produces a maximum reduction in the description length based on the second plurality of changes in the description length.

8. The method of claim 4 wherein the first plurality of neighboring nodes includes at least one meta-node.

9. The method of claim 4 wherein the first node in the first set is a meta-node.

10. The method of claim 1, wherein the at least one first meta-node comprises a plurality of first meta-nodes and the at least one second meta-node comprises a plurality of second meta-nodes, the modifying further comprising at least one of:

visually arranging graphical elements of the first graphical depiction corresponding to at least one of (i) the plurality of first meta-nodes and (ii) the plurality of second meta-nodes based on the input from the user; and filtering at least one graphical element of the first graphical depiction corresponding to at least one of (i) a first meta-node in the plurality of first meta-nodes and (ii) a second meta-node in the plurality of second meta-nodes based on the input from the user.

11. A system for generation of graphical depictions of a bipartite graph comprising:

a display output device;
a user interface;
a memory configured to store:
program instructions; and
bipartite graph data, the bipartite graph data further comprising:
a first set including a first plurality of nodes;
a second set including a second plurality of nodes, the first set and the second set being disjoint; and
a plurality of edges, each edge in the plurality of edges connecting one node in the first plurality of nodes to another node in the second plurality of nodes; and a processor operatively connected to the display output device, the user interface, and the memory, the processor being configured to execute the program instructions to:

generate at least one first meta-node including at least two nodes in the first plurality of nodes and at least one second meta-node including at least two nodes in the second plurality of nodes based on the bipartite graph data using a minimum description length (MDL) optimization process to generate the at least one first meta-node and the at least one second meta-node;

generate a first graphical depiction of the at least one first meta-node and the at least one second meta-node, the first graphical depiction including a single edge connecting the at least one first meta-node and the at least one second meta-node to provide a summarized display of the bipartite graph data using the display output device;

receive, from the user interface, an input from a user; and modify the first graphical depiction of the at least one first meta-node and the at least one second meta-node based on the input from the user.

12. The system of claim 11, the processor being further configured to:

identify a first node in the at least one first meta-node that is not connected to a second node in the at least one second meta-node based on the bipartite graph data; and generate a second graphical depiction of the first node and the second node with a graphical element that indicates the first node is not connected to the second node to provide a display of a correction to the summarized display of the bipartite graph data using the display output device.

13. The system of claim 11, the processor being further configured to:

identify a first node in the at least one first meta-node that is connected to a second node in the second set that is not present in the at least one second meta-node based on the bipartite graph data; and generate a second graphical depiction of the first node and the second node with a graphical element that indicates the first node is connected to the second node to provide a display of a correction to the summarized display of the bipartite graph data using the display output device.

14. The system of claim 11, the processor being further configured to:

select a first node in the first set;
identify a first plurality of neighboring nodes of the first node, each node in the plurality of neighboring nodes also being in the first set;
identify a first plurality of changes in description length that are produced by merging the first node with each node in the first plurality of neighbor nodes; and
generate the at least one first meta-node by merging the first node with one node in the first plurality of neighbor nodes that produces a maximum reduction in the description length in the MDL optimization based on the first plurality of changes in the description length.

15. The system of claim 14, the processor being further configured to:

identify at least one node in the first plurality of neighbor nodes using a two-hop search process, the processor being configured to perform the two-hop search process to:
identify a second node in the second set that is connected to the first node by a first edge in the bipartite graph data; and
identify the at least one node in the first plurality of neighbor nodes in the first set that is connected to the second node by a second edge in the bipartite graph data.

16. The system of claim 14, the memory being further configured to store:

a locality-sensitivity hash (LSH) table; and
the processor being further configured to:
identify the first plurality of neighbor nodes using the LSH table, each of the first plurality of neighboring nodes having a Jaccard index value indicating similarity to the first node in the LSH table that exceeds a predetermined threshold.

17. The system of claim 14, the processor being further configured to:

select a second node in the second set;
identify a second plurality of neighboring nodes of the second node, each node in the second plurality of neighboring nodes also being in the second set;
identify a second plurality of changes in description length that are produced by merging the second node with each node in the plurality of neighbor nodes; and
generate the at least one second meta-node by merging the second node with one node in the second plurality of neighbor nodes that produces a maximum reduction in the description length based on the second plurality of changes in the description length.

18. The system of claim 14 wherein the first plurality of neighboring nodes includes at least one meta-node.

19. The system of claim 14 wherein the first node in the first set is a meta-node.

20. The system of claim 11, wherein the at least one first meta-node comprises a plurality of first meta-nodes and the at least one second meta-node comprises a plurality of second meta-nodes, the processor being further configured to at least one of:

- modify the first graphical depiction by visually arranging graphical elements of the first graphical depiction corresponding to at least one of (i) the plurality of first meta-nodes and (ii) the plurality of second meta-nodes based on the input from the user; and
- modify the first graphical depiction by filtering at least one graphical element of the first graphical depiction corresponding to at least one of (i) a first meta-node in the plurality of first meta-nodes and (ii) a second meta-node in the plurality of second meta-nodes based on the input from the user.

* * * * *